United States Patent
Kaiser et al.

(10) Patent No.: US 6,183,174 B1
(45) Date of Patent: Feb. 6, 2001

(54) BORING HEAD

(75) Inventors: Heinz Kaiser, Wallisellen; Deiter Pape, Rumlang, both of (CH)

(73) Assignee: Heinz Kaiser AG, Rumlang (CH)

( * ) Notice: Under 35 U.S.C. 154(b), the term of this patent shall be extended for 0 days.

(21) Appl. No.: 09/409,371

(22) Filed: Sep. 30, 1999

(30) Foreign Application Priority Data

Oct. 2, 1998 (CH) ................................................ 201198

(51) Int. Cl.⁷ .................................................. B23B 29/02
(52) U.S. Cl. ............................ 408/185; 407/47; 408/197
(58) Field of Search .............................. 407/44, 45, 46, 407/47; 408/181, 185, 186, 190, 197, 231, 233, 713

(56) References Cited

U.S. PATENT DOCUMENTS

| 3,782,849 | 1/1974 | Mizoguchi . | |
|---|---|---|---|
| 4,043,697 | * 8/1977 | Eckle | 407/45 |
| 4,231,691 | 11/1980 | Pape et al. . | |
| 4,632,609 | * 12/1986 | Johne | 408/713 |
| 5,054,970 | 10/1991 | Steiner . | |
| 5,330,297 | * 7/1994 | Engstrand | 408/185 |

* cited by examiner

*Primary Examiner*—Daniel W. Howell
(74) *Attorney, Agent, or Firm*—Schnader Harrison Segal & Lewis LLP

(57) ABSTRACT

On a tool body at least one bit carrier is mounted capable of sliding. Clamping means are provided for clamping the bit carrier against a clamp plate of the tool body. A catch plate of the tool body operates with a corresponding catch plate of the bit carrier for transmission of torque. The tool body at a distance from its catch plate has a slanted outer wedge surface against which the a slanted wedge surface of the bit carrier is clamped. The wedge surface of the tool body exerts a radial clamping force on the bit carrier which clamps the catch plate surface of the bit carrier radially against the catch plate surface of the tool body.

14 Claims, 2 Drawing Sheets

BORING HEAD

BACKGROUND

1. Field of the Invention

The invention concerns a boring head with a tool body and at least one bit carrier detachably affixed to it. More specifically, the invention concerns such a boring head wherein the at least one bit carrier is slidably mounted for the radial adjustment of the bit on a clamp plate of the tool body. Most specifically, the invention concerns such a boring head with clamping means for clamping the bit carrier against the above-noted clamp plate and with a catch plate arranged on the tool body which collaborates with a corresponding catch plate of the bit carrier for the transmission of torque.

2. Description of the Related Art

A boring head of this type is known as state of the art from U.S. Pat. No. 4,231,691 of the applicant. In this case two bit carriers are provided which are continuously and independently adjustable, axially as well as radially. The tool body has a radially running, continuous channel on an end side in which the two bit carriers are supported for radial displacement and for the transmission of torque. The two bit carriers are clamped axially against the tool body with a clamping screw. The fine axial adjustment of the two bit carriers is accomplished in each case with a set screw which is inserted in an axial threaded boring of the bit carrier and which is supported at its thinner end on an adapter plate of the tool body. The positioning of the set screws on the tool body results in a punctiform support.

U.S. Pat. No. 5,054,970 shows a boring head which also has two bit carriers. For clamping the two bit carriers. Two clamping screws are provided which run at an angle to the axis of rotation of the tool, and, in each case, clamp a bit carrier against the tool body. The two bit carriers are seated in a guide channel of the tool body. For radial and axial adjustment of the bit carrier, two coaxially arranged adjusting screws are provided and arranged in the tool carrier. One of these screws has an eccentric head which lies on a bit carrier on the bottom side. Upon the rotation of this adjusting screw the corresponding bit carrier is moved axially. Here also the bit carrier is supported in a punctiform manner on the above-mentioned eccentric adjusting screw.

U.S. Pat. No. 3,782,849 shows a boring head with two bit carriers which are gear-cogged with each other. The gear-cog engagement of the two bit carriers increases the stability but prevents continuous axial adjustment of the bits.

SUMMARY AND OBJECTS OF THE INVENTION

The invention has the objective of devising an economical boring head of the type mentioned in which the individual axially and radially adjustable bit carriers are supported stably on the tool body for the transmission of torque and which despite this makes simple manipulation possible.

According to the invention, a boring head has a tool body with an obliquely angled outer wedge surface disposed a distance from a catch plate. The tool body outer wedge surface engages and clamps an angled wedge surface of the bit carrier, such that the wedge surface of the tool body exerts a radial clamping force on the bit carrier which clamps the catch plate of the bit carrier radially against the catch plate of the tool body. In the boring head according to the invention, a defined and flat positioning on the tool body is assured for both bit carriers. With each of the above-noted wedge surfaces, a radial force is exerted on the two bit carriers which clamps the two catch plates together. It is essential that this clamping be independent of the axial position of the bit carrier in question. The positioning of these two catch plates is assured in every axial position. In the case of a bit height adjustment, this flat positioning does not change. The two catch plates are necessarily under the tension of the radial force exerted by the above-mentioned two wedge surfaces.

According to another modification of the invention, each catch plate and the wedge surface of the tool body are arranged on an axially projecting extension of the tool body and this extension engages a depression in the bit carrier. In the boring head according to the invention the two bit carriers are not mounted in a channel of the tool body but rather are seated on a projecting and saddle-shaped extension of the tool body. On this extension, the slanted wedge surface and the catch plate are arranged at a distance from each other. The extension engages a corresponding channel-like depression on the bit carrier. In the case of a two-bit cutter, accordingly, two such extensions are provided and each bit carrier has a corresponding channel on the bottom side. Through this modification of the invention the tool body can be made much more compact than before. The previously disturbing side lobes of the channel can be avoided which results in a better removal of cuttings. The most disturbance-free removal of cuttings possible is an essential property of such a boring head. Cleaning is facilitated because of the compact construction.

According to another modification of the invention, the two wedge surfaces are slanted at different angles with respect to the axis of rotation of the tool body for essentially linear positioning of the bit carrier on the tool body. The radial clamping force can be optimally adjusted via a defined angular difference between the two wedge surfaces.

According to one variant of the invention, it is envisaged that the axial adjusting means has an elongated eccentric roll which is rotatably mounted in the tool body and with which the bit carrier collaborates along a linear contact surface. The bit carrier is moved axially by the rotation of this eccentric roll. The contact surface between the roll and the bit carrier is linear and not punctiform. The eccentric roll preferably extends essentially over the entire length of the clamp plate. Upon the adjustment of the axial position, the bit carrier is also pivoted about the also linear contact surface of the two wedge surfaces. This pivoting motion is independent of the radial position of the bit carrier. Even if the radial position is changed, the length of the tool is precisely maintained. Therefore, no secondary correction is necessary.

For the radial adjustment of the bit carrier according to another variant, it is envisioned that the bit carrier has a set screw running transversely to the axis of rotation which can be placed on the clamp screw for adjusting the boring diameter. This clamp screw preferably extends axially into a threaded boring on the tool body and clamps the bit carrier against the tool body.

Other advantageous features maybe derived from the following description, the dependent patent claims, and the drawings.

BRIEF DESCRIPTION OF THE DRAWINGS

An example of a preferred embodiment of the invention is explained in the following with reference to the drawings where.

DETAILED DESCRIPTION

Figure 1:
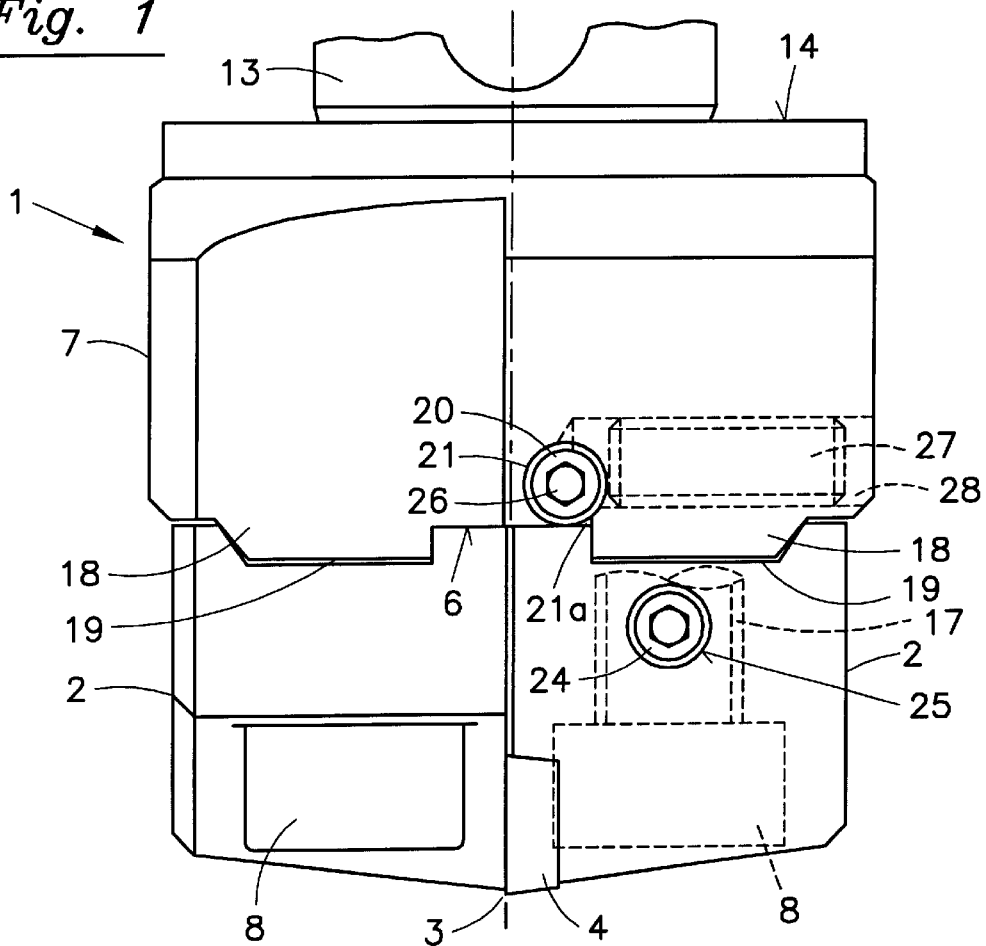
FIG. 1 is a side, elevational view of a boring head according to the invention, seen perpendicularly to the cutting force.

The boring head 1 has an essentially cylindrical tool body 7 on which two identical bit carriers 2 are mounted. On each bit carrier 2, a cutting plate 4, which has a bit 3, is affixed by a clamp screw 5. The boring head 1, shown in the Figures, is a so-called two-bit cutter, but a design is possible in which only a single-bit carrier with a cutting plate 4 is mounted on the tool body 7.

Figure 2:
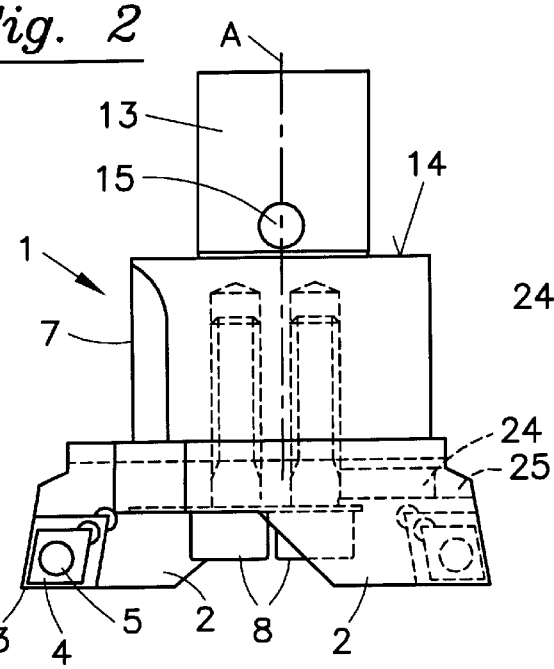
FIG. 2 is reduced, side, elevational view of a boring head according to the invention, seen parallel to the cutting force.
Figure 3:
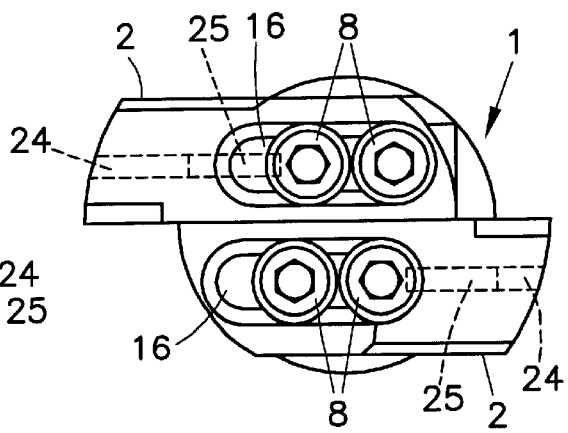
FIG. 3 is another view of the boring head.

The boring head 1 has the axis of rotation A shown in FIG. 2 and a fixation lug 13 with which the boring head 1 can be detachably affixed in a shaft, not shown, or similar fixation part. For this purpose by conventional means a not-shown clamp screw is provided which engages a hole 15 on the fixation lug 13 in order to engage an adapter plate 14 running transversely to axis A on a corresponding surface of the fixation part. For torque transmission, the fixation lug 13 may also have a catch which is not shown here. The torque is transmitted as a cutting force F, which is applied substantially tangential to an arc circumscribed about the axis of rotation A by the bit 3.

The tool body 7 is generally cylindrical, and rotates about axis A for transmission of toque from the shaft (fixation part). The tool body 7 has an extension 18 for engaging each bit carrier 2. Each extension 18 runs transversely to axis A, across substantially the entire width of the tool body 7 and projects axially therefrom. An outer edge of each extension 18 has an obliquely angled wedge surface 11. An inner edge, distantly spaced from the outer wedge surface 11, forms a catch plate surface 9 substantially parallel to the axis of rotation A. Means for attaching the bit carriers 2 for axial and radial adjustment are also provided.

Each bit carrier 2 is provided with a channel-like recess 19 for accepting and engaging a respective extension 18 of the tool body 7. An outer edge of the recess 19 is provided with an obliquely angled wedge surface 12 for linearly engaging the outer wedge surface 11 of the tool body 7. An inner edge of the recess 19 is defined by a catch plate surface 10 substantially parallel to the axis of rotation A, for at least linearly engaging the catch plate surface 9 of the tool body 7. Means for attaching each bit carrier 2 to the tool body 7 are also provided.

Figure 4:
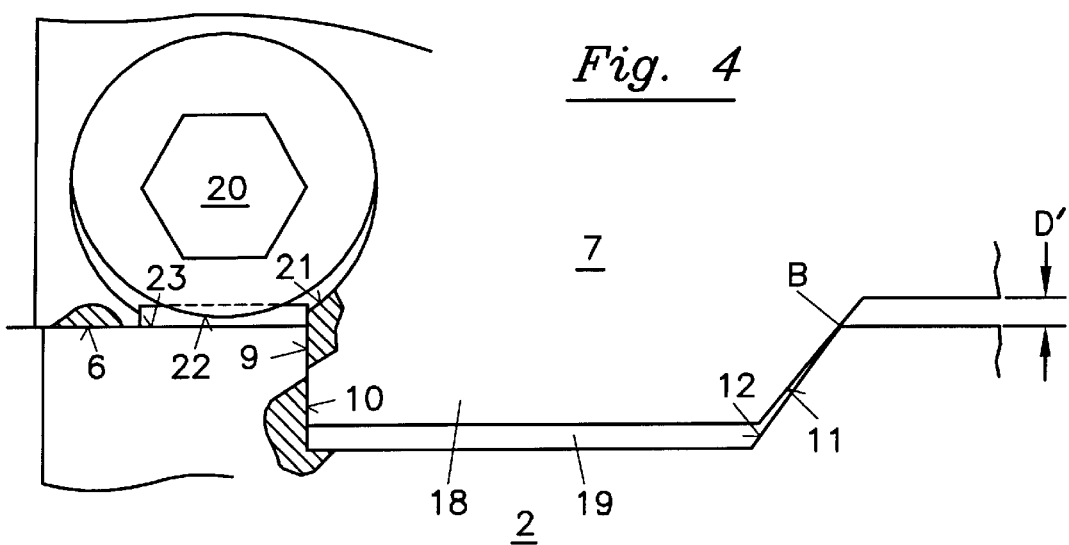
FIGS. 4 and 5 are partial views of the boring head at the same bit heights but different production tolerances.
Figure 5:
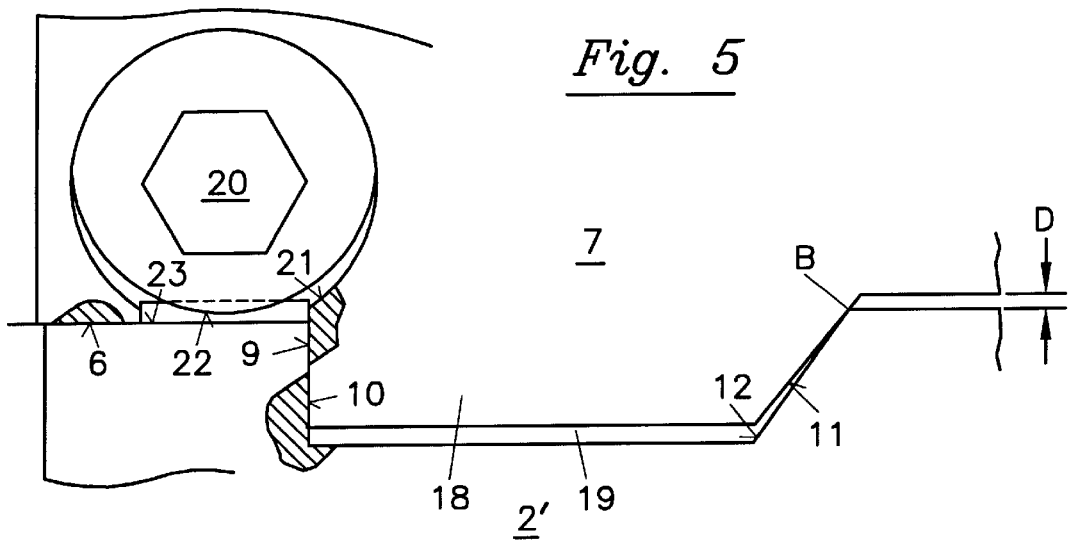
Figure 6:
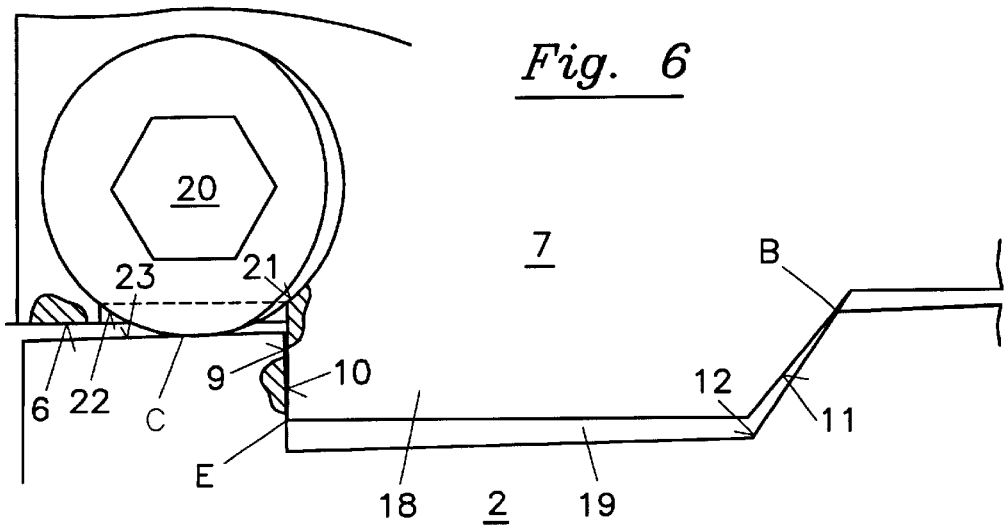
FIG. 6 is another partial view with axially adjusted bit carrier.

To attach the two bit carriers 2 to the tool body 7 at least two clamping screws 8 are provided, which pass through a transversely elongated hole 16 of each bit carrier 2 and which in each case are inserted in an axial threaded boring 17 of the tool body 7. All clamping screws 8 run parallel to the rotation axis A. By tightening the clamping screws 8, each bit carrier 2, is clamped independently of the other against a clamp plate 6 of the tool body 7. The two bit carriers 2 lie on the same clamp plate 6 which is arranged, as FIG. 1 shows, between two saddle-shaped extensions 18 of the tool body 7. These extensions 18 extend essentially over the entire width of the tool body 7 and in each case engage the channel-like recess 19 on the bit carrier 2. Each extension 18, as discussed above, have an outside wedge surface 11 slanted toward the axis A and an inside catch surface 9 running parallel to the axis A. Corresponding to this, each recess 19 have an outside wedge surface 12 as well as a catch plate surface 10. The two catch plate surfaces 9 and 10 lie flatly on each other while the contact surface between the two wedge surfaces 11 and 12 is linear. The wedge surfaces interact by forcing the tool body and bit carrier radially until said catch plate surfaces are maintained in at least linear contact with each other. In FIGS. 4 through 6, this linear contact surface is denoted by B.

For the height adjustment of the bit in the tool body 7, two rolls 20 in each case are mounted at a distance from each other and are capable of limited rotation in a smooth cross boring 21. These rolls 20 have an eccentric cross-section, as FIGS. 4 through 6 show in particular. For rotation of the rolls 20, the latter in each case have a hexagonal depression 26 into which a suitable tool key can be inserted. With a screw 27 screwed into a threaded boring 28, the rolls 20 can be fixed in a rotation-proof manner. The borings 21 in each case display a longitudinal opening 21a which extends through the clamp plate 6. In the rotational position of the roll 20, shown in FIG. 4, the roll surface 22 is located entirely within the adapter plate 6. That is, roll 20 does not contact the surface 23 of the bit carrier 2. If the roll 20 is rotated by a few (e.g. 10) degrees, then its roll surface 22 contacts and lies on the flat inner surface 23 of the neighboring bit carrier 2 and upon continued rotation of the roll 20 in the same direction exerts an axial force on the bit carrier 2. If the bit carrier 2 is not fixed by the two clamping screws 8 then the bit carrier 2 and with it the bit 3 is moved axially. At the same time the surface 23 of the bit holder 2 disengages the clamp plate 6 of the tool body 7. The contact surface between the roll 20 and the bit carrier 2 is not punctiform, but rather extends over essentially the entire width of the tool body 7. In FIG. 6 this contact surface is denoted by C. The rolls 20 are preferably designed in such a way that they can only turn through an angular range of 90°. The direction of rotation for raising the bit height is therefore always the same. The end positions of the pivoting motion can be achieved by stops not shown here. However, a design is also conceivable in which the rolls 20 are capable of unlimited rotation.

For radial adjustment of the two bit carriers 2, each has a set screw 24 in a threaded boring 25 which lies at its inner end on one of the clamping screws 8. The screws 24 each extend transversely to the rotation axis A and parallel to the radial adjustment direction of the bit carrier 2. Rotation of the set screw 24 in the threaded boring 25 results in corresponding radial movement of the bit carrier 2 inwardly or outwardly. The boring diameter is thus reduced or enlarged.

The radial adjustment of the boring diameter by the set screws 24 is independent of the bit height adjustment produced by the rolls 20. A shifting of the bit carrier 2 in the radial direction therefore has no effect on the bit height and conversely a change in the bit height has no effect on the boring radius. The adjusted positions of the two bit carriers 2 are maintained by tightening the clamping screws 8. The rolls 20 are preferably formed to be self-locking. Upon the tightening of the clamping screws 8 the rotational positions of the rolls 20 are not changed.

FIG. 4 shows a bit carrier 2 in a position in which it lies flatly on the clamp plate 6. The roll 20 is, therefore, not engaged with the bit carrier 2. The two clamping screws 8 of the bit carrier 2 are tightened. Through the action of the wedge surface 11, the catch plate surface 10 is clamped against the catch plate surface 9 of the tool body 7. This support of the bit carrier 2 on the tool body 7 is essentially independent of any tolerance deviations.

FIG. 5 illustrates this point, showing a bit carrier 2' in which the distance between the catch plate 10 and the wedge surface 12 is greater than in the case of the bit carrier 2 shown in FIG. 4. The contact surface B between the two wedge surfaces 11 and 12 has been pushed upward compared to FIG. 4, the distance D between the bit carrier 2' and the tool body 7 is therefore smaller than the corresponding distance D' in FIG. 4. The wedge surface 11, however, even with this tolerance deviation, exerts a force on the bit carrier 2' which clamps the catch plate surface 10 against the catch plate surface 9. This clamping force is also assured in the position shown in FIG. 6 where the bit carrier 2 is lifted by the roll 20 away from the clamp plate 6. The two catch plate surfaces 9 and 10 are slightly slanted toward each other and display an approximately linear contact surface E. The bit carrier 2 is therefore braced on the surfaces B, C and E on the tool body 7. The surfaces B, C and E, as mentioned, are not punctiform but rather extend linearly over essentially the entire width of the tool body 7. In this way an especially stable support of the bit carrier 2 on the tool body 7 is achieved. Such a support is assured in every position of the bit carrier 2 and also in the case of tolerance deviations on the bit carrier 2 and on the tool body 7.

The bit height adjustment via rolls 20 is therefore continuous. During the independent bit height adjustment, each bit carrier 2 is lifted in parallel. In this way compensation for fabrication tolerances of the bit carriers and of the clamp plates which act on the bit height and have unfavorable results on the working conditions, may be made. It is also possible to match the height of the two bits to each other in order to achieve a uniform cut division.

We claim:

1. A boring head comprising:
a tool body and at least one bit carrier affixed to the tool body in a detachable manner, wherein the bit carrier is slidably mounted for radial adjustment on a clamp plate of the tool body, with clamping means for clamping the bit carrier against said clamp plate and with a catch plate surface arranged on the tool body which collaborates with a corresponding catch plate of the bit carrier for transmission of torque, wherein the tool body at a distance from its catch plate surface has an angled outer wedge surface against which an angled wedge surface of the bit carrier is clamped and wherein the wedge surface of the tool body exerts a radial clamping force on the bit carrier which clamps the catch plate of the bit carrier radially against the catch plate of the tool body, and wherein said bit carrier carries a bit and transmits torque as a cutting force in a direction tangential to an arc circumscribed about the axis of rotation by the bit.

2. The boring head as in claim 1, wherein the catch plate surface and the wedge surface of the tool body are arranged on an extension of the tool body and wherein the extension engages a recess in the bit carrier.

3. The boring head as in claim 1, wherein each wedge surface is slanted at a different angle with respect to the axis of rotation of the tool body in such a way that the wedge surface of the bit carrier linearly contacts the wedge surface of the tool body.

4. The boring head as in claim 1, wherein the tool body has a clamp plate located at a distance from its wedge surface and running perpendicular to the axis of rotation to which an upper surface of the bit carrier can be flatly positioned.

5. The boring head as in claim 1, wherein the catch plate surface of the bit carrier and the catch plate surface of the tool body run essentially at right angles to the cutting force.

6. The boring head as in claim 1, wherein the tool body at a distance from the two wedge surfaces has adjusting means with which the bit can be moved axially for height adjustment.

7. The boring head as in claim 6, wherein the adjusting means is at a right angle to the axis of rotation and is disposed for linear contact with the bit carrier.

8. The boring head as in claim 6, wherein the adjusting means comprises an eccentric roll which is rotatably mounted in the tool body for linear contact with the bit carrier.

9. The boring head as in claim 8, wherein the eccentric roll is mounted in a self-locking manner in a boring within said tool body.

10. The boring head as in claim 6, wherein the adjusting means are arranged in the tool body between the catch plate surface and the clamp plate of the tool body.

11. The boring head as in claim 1, wherein the clamping means comprises at least one clamping screw which extends axially into a threaded boring of the tool body and clamps the bit carrier against the tool body.

12. The boring head as in claim 11, wherein the clamp screw slidably engages a transversely elongated hole of the bit carrier.

13. The boring head as in claim 11, wherein the bit carrier comprises a set screw running transversely to the axis of rotation for radially adjusting the boring diameter.

14. The boring head as in claim 1, wherein two bit carriers are mounted on the tool body.

* * * * *